United States Patent [19]

Sasaki et al.

[11] Patent Number: 4,675,697
[45] Date of Patent: Jun. 23, 1987

[54] THERMAL HEAD DRIVING DEVICE

[75] Inventors: Eiichi Sasaki, Sagamihara; Takashi Inoue, Asaka, both of Japan

[73] Assignee: Ricoh Company, Ltd., Tokyo, Japan

[21] Appl. No.: 788,572

[22] Filed: Oct. 17, 1985

[30] Foreign Application Priority Data

Oct. 17, 1984 [JP] Japan .................. 59-217962

[51] Int. Cl.[4] ............................................ G01D 15/10
[52] U.S. Cl. ................... 346/76 PH; 364/514
[58] Field of Search .......... 400/120; 250/318; 214/216 PH; 364/514, 518, 76 PH; 358/248

[56] References Cited

U.S. PATENT DOCUMENTS 4,368,491 1/1983 Saito ..................... 346/76 PH

Primary Examiner—Arthur G. Evans
Attorney, Agent, or Firm—Oblon, Fisher, Spivak, McClelland & Maier

[57] ABSTRACT

A thermal head driver for printing out images by selectively energizing a plurality of heat-generating resistance elements which are arranged in an array, or line, to constitute a thermal head. The resistance elements are energized on an every second pixel basis or, alternatively, a plurality of resistance elements associated with odd pixels and those associated with even pixels are energized at different time points, yet a plurality of resistance elements out of each of the odd and even resistance elements are energized at the same time. Such causes any pixel to be printed out only upon the lapse of a predetermiend period of time after two immediately adjacent pixels in a line direction have been printed out.

3 Claims, 8 Drawing Figures

THERMAL HEAD DRIVING DEVICE

BACKGROUND OF THE INVENTION

1. Field of the Invention

The present invention relates to a device for driving a thermal head which is used with a thermal printer or the like and, more particularly, to a device for controlling the drive of heat-generating resistance elements, which are arranged in an array to constitute a thermal head, and capable of automatically controlling the printout density to an optimum one.

2. Discussion of Background

Generally, a thermal printer includes a thermal head which has an array of heat-generating resistance elements arranged to cover one whole line. The resistance elements are energized in a predetermined sequence responsive to a command from a controller so as to print out pictures, characters and others as dots on a heat-sensitive paper or a thermal transfer member. A predominant approach for thermal printing or thermal transfer printing is controlling the color-developing density or the color-developing area in dependence upon the duration or the peak of power which is supplied to the resitance elements. As generally accepted, the density or the area of color development in such a printing technology is a monotone incremental function which shows saturation with respect to the duration or the peak of power supplied to the resistance elements. In practice, however, the density or the area varies with the quantity of heat which is accumulated in a resistance element, resulting in an uneven density distrubution. Especially, those resistance elements which are horizontally aligned in the same line have such influence on each other that the attainable image reproducibility is signifiantly limited.

In light of this, some approaches for the drive and control of resistance elements have been proposed as enumerated below.

(1) In a drive control circuit for an array of heat-generating resistance elements adapted for thermal printing, means is provided for storing image signals associated with lines i, i—1, . . . , i—1 at the instant when power is applied to resistance elements associated with the respective pixels of the line i responsive to image signals so as to print out images which correspond to the image signals. Means is also provided for density-compensating the image signals of the line i depending upon the time interval between the start of printing the line i—1 and that of the line i, the time interval between the start of printing the line i—2 and that of the line i—1, . . . , the time interval between the start of printing the line i—t—1 and that of the line i—t. Means is further provided or controlling the duration or the peak of power to be supplied to the resistance elements. Such means cooperate to compensate the density of image signals, control the duration or the peak of power supplied to the respective pixels of the line i responsive to the compensated image signals, and thereby suppress the irregularity in density. For details of such a scheme, a reference may be made to Japanese Unexamined Patent Publication (Kokai) No. 58-146176.

(2) At a certain dot timing, those resistance elements of a print head which neighbor a resistance element energized two dots before and a resistance element energized one dot before are applied with drive pulses the width of which is narrower than the others, thereby setting up even density among the various dots. This approach is disclosed in, for example, Japanese Unexamined Patent Publication (Kokai) No. 57-34986.

(3) In a thermal printer of the type having N heat-generating resistance elements, and applying drive pulses to the resistance elements in a predetermined sequence to cause them to generate heat to thereby print out images, information of the resistance elements concerning past, present and future heat generation is detected so that the number of drive pulses to be applied to a resistance element which is expected to generate heat is varied such that a substrate, which supports the resistance elements, is kept at a temperature lower than a predetermined one. This approach is directed toward preventing running of printed images due to temperature elevation of the substrate, as disclosed in Japanese Unexamined Patent Publication No. 57-117978.

The problems with all the approaches (1)–(3) discussed above is that a significantly complicated control circuit is required in order than the density may be compensated by varying the duration of power supply to resistance elements, pulse width, peak or the like in dependence upon the surrounding conditions.

SUMMARY OF THE INVENTION

It is therefore an object of the present invention to provide a thermal head driving device for use particularly with a thermal printer or the like which is capable of printing out images without irregular density distributions and using a relatively simple technique.

It is another object of the present invention to provide a generally improved thermal head driving device.

A thermal head driving device for selectively causing a pluarality of heat-generating resistance elements, which are arranged in an array to constitute a thermal head, to generate heat for printing out images of the present invention has a circuit for driving the resistance elements on an every second pixel basis such that one pixel is printed out upon the lapse of a predetermined period of time after two pixels which immediately neighbor the one pixel in a direction of a line have been printed out.

The above and other objects, features and advantages of the present invention will become more apparent from the following detailed description taken with the accompanying drawings.

DESCRIPTION OF THE PREFERRED EMBODIMENTS

While the thermal head driving device of the present invention is susceptible of numerous physical embodiments, depending upon the environment and requirements of use, substantial numbers of the herein shown and described embodiments have been made, tested and used, and all have performed in an eminently satisfactory manner.

Figure 1:
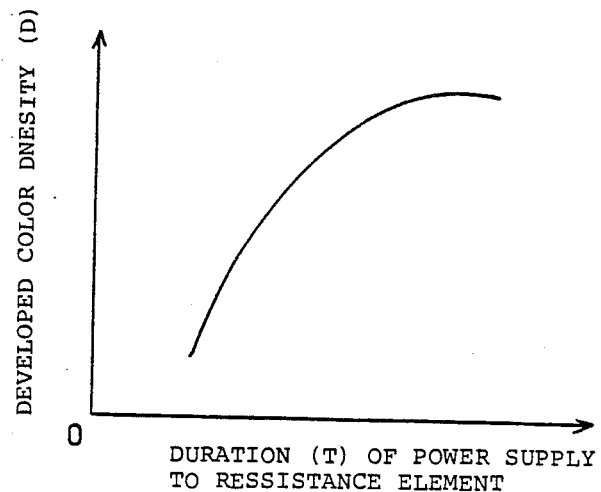
FIGS. 1 and 2 show characteristic curves useful for explaining a prior art thermal head driving system.
Figure 2:
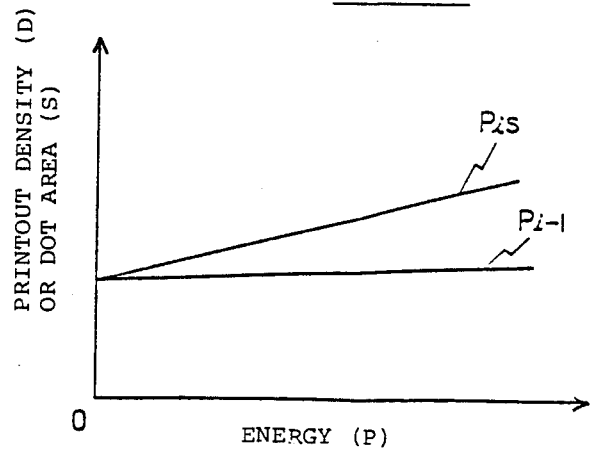

Generally, a thermal head which comprises a plurality of heat-generating resistance element arranged in an array over one line develops a color as shown in FIG. 1 by a thermosensitive or a thermal transfer type recording process. Specifically, as shown in FIG. 1, the color-developing density is a monotone incremental function which shows saturation with respect to a duration of power supply to the resistance elements. In FIG. 1, the abscissa represents time T and the ordinate, developed color density D. In practice, however, the density or the area of color development varies with the amount of heat which is stored in the resistance elements, resulting in an uneven density distribution. An example of such a variation is shown in FIG. 2, in which the abscissa represents applied energy P and the ordinate, dot density D or dot area S. Specifically, FIG. 2 shows an occurrence that energy (power) $P_{i-1}$ applied to a heat-generating resistance elements on a line $i-1$ effects energy $P_{is}$ which is applied to resistance elements on a line i, thereby varying the printout density D (or dot area S) of the latter.

As described above, the problem with the prior art thermal printing system is that the color-developing density varies with the amount of heat which has been accumulated in heat-generating resistance elements and such is reflected by an irregular density distribution. This problem is critically pronounced when it comes to resistance elements which neighbor each other in the same horizontal line, limiting the reproducibility of image data to a significant degree.

Hereinafter will be described preferred embodiments of the thermal head driving device of the present invention which are free from the above-discussed problem. In all the drawings, the same or similar structural elements are designated by like reference numerals and repeated description thereof will be omitted for simplicity.

FIRST EMBODIMENT

Figure 3:
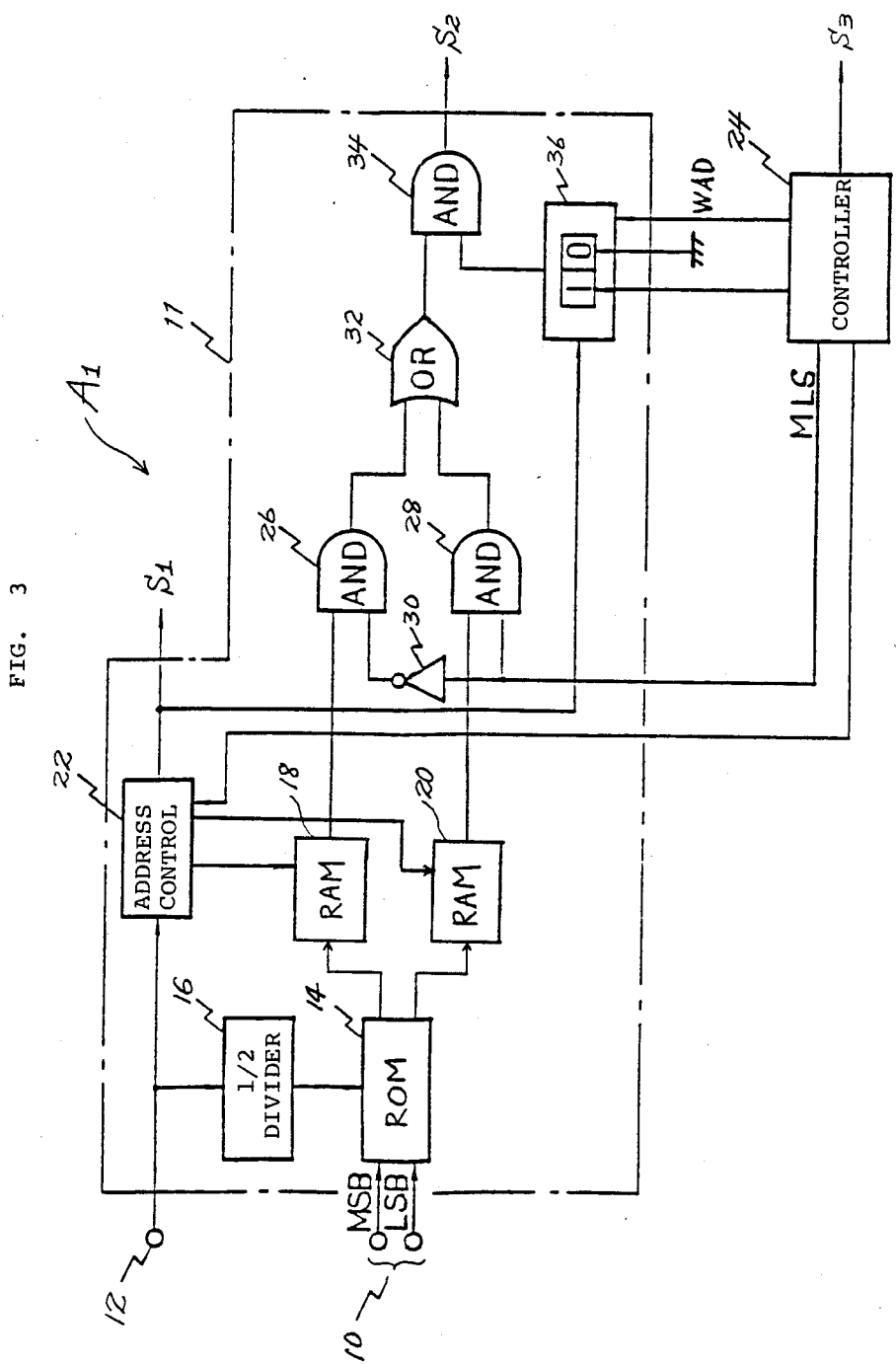
FIGS. 3 and 4 are diagrams showing a thermal head driving device in accordance with a first embodiment of the present invention.
Figure 4:
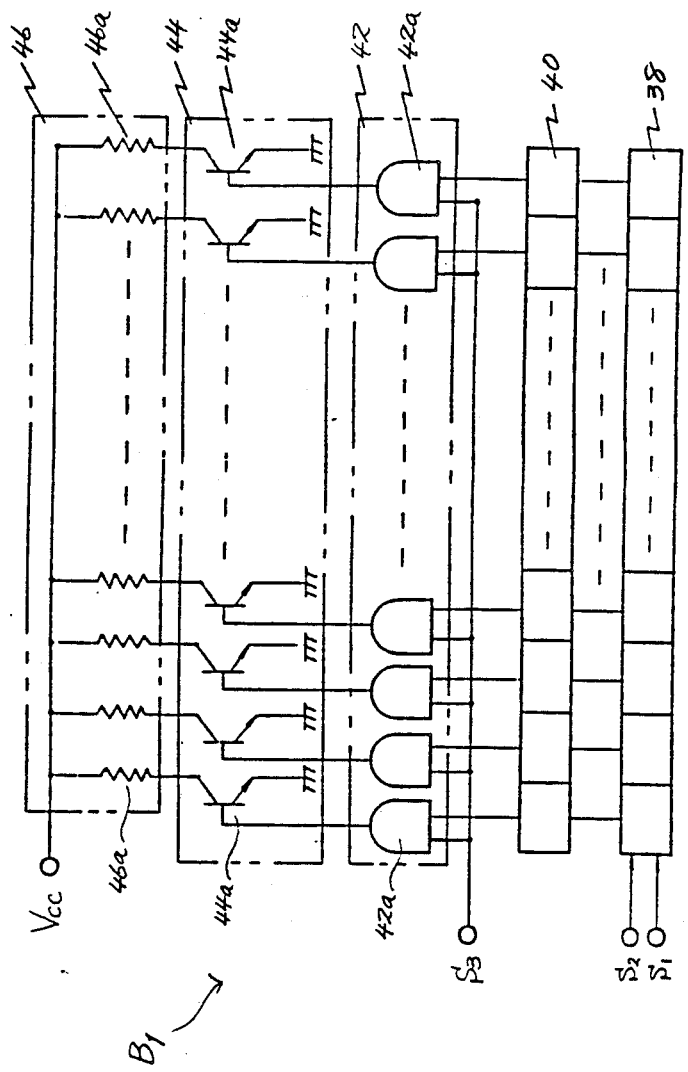

A thermal head driver in accordance with a first embodiment is applied to a thermal printer and shown in FIGS. 3 and 4. As shown, the thermal head driver generally comprises an image signal processing circuit $A_1$ which includes an odd/even pixel separator 11 adapted to separate odd pixels and even pixels from each other, and a resistance element driving circuit $B_1$. In FIG. 3, an image signal such as a two-bit, four-gradation image signal is applied to an image signal input terminal 10. In the case of a four-gradation image signal, the two bits may be "11" indicative of a dot having the greatest area, "10" indicative of a dot having a medium area, "01" indicative of a dot having the smallest area, and "00" indicative of no dot. A synchronizing clock each two pulses of which correspond to one dot is applied to a sync clock input terminal 12. The four-gradation image signal is routed to a data conversion ROM 14 synchronized with the clock. Also routed to the data conversion ROM 14 are clock pulses, or data, which a ½ divider 16 produces by halving the frequency of the clock.

A RAM 18 is adapted to store the most significant bit (MSB) of an image signal, while a RAM 20 is adapted to store the least significant bit (LSB) of the same. Each of these RAMS 18 and 20 functions to store the image signals, which are output from the ROM 14, as addressed by a RAM address control 22 in synchronism with the clock which is fed to the control 22. Responsive to a RAM 18 and RAM 20 read start signal output from a controller 24, the RAM address control 22 generates an image signal write sync signal $S_1$ which is delivered to the resistance element driving circuit $B_1$. The output of the RAM 18 is coupled to one input terminal of an AND gate 26, and that of the RAM 20 to one input terminal of an AND gate 28. The controller 24 produces an MSB/LSB selection signal MLS which, for example, turns to a ZERO to instruct selection of MSB of an image signal and to a ONE to instruct selection of LSB. The signal MLS is applied to the other input terminal of the AND gate 26 via an inverter 30 and to the other input terminal of the AND gate 28. The outputs of the AND gates 26 and 28 are fed to an OR gate 32 the output of which in turn is fed to one input terminal of an AND gate 34. The AND gate 34 produces an image signal $S_2$, while the controller 24 produces a strobe $S_3$.

An odd/even pixel selection counter 36 accommodates numerical values in two bits or digits, upper and lower. A value in the upper bit is applied to the other input terminal of the AND gate 34. The counter 36 is initialized by a load signal WAD output from the controller 24 such that a numerical value is loaded in the upper bit, the lower bit being constantly connected to ground to remain "0". For example, the arrangement is such that when the upper bit is "1", an odd pixel is selected and, when it is "0", an even pixel. After the initialization, the upper bit of the counter 36 sequentially changes from "1" to "0" and from "0" to "1" in synchronism with the data write sync signals $S_1$ which are applied to the circuit $B_1$.

As shown in FIG. 4, the image signals $S_2$ from the AND gate 34 are applied to a shift register 38 timed to the data write sync signals $S_1$. One line of image signals are loaded in the shift register 38 and latched in a latch circuit 40. An AND gate group 42 is made up of AND gates 42a each of which receives an output of the latch circuit 40 at one input terminal thereof. Applied to the other input terminal of each AND gate 42a is the strobe $S_3$ which is output from the controller 24. The output of each AND gate 42a is coupled to the base of one particular transistor 44a of a switching transistor group 44 as illustrated. Meanwhile, a heat-generating resistance element group 46 comprises a plurality of heat-generating resistance elements 46a. Each element 46a in the group 46 has one end connecting to the collector of one particular transistor 44a of the group 44 and the other end connecting to a predetermined voltage Vcc.

The operation of the thermal head driver in accordance with the first embodiment will be outlined.

Figure 5:
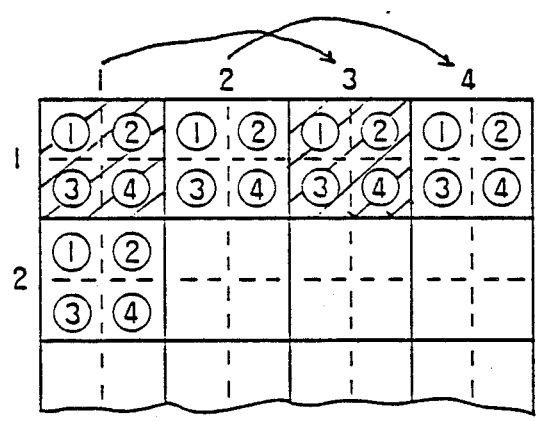
FIG. 5 shows printout timings representative of a method which uses a 2×2 dots pixel in accordance with the first embodiment.

As shown in FIG. 5, assume that one pixel comprises four dots #1 to #4, and that such pixels are arranged in a matrix horizontally and vertically as labeled #1, #2, #3 . . . Sequentially printed out first are the image signals representative of the dots in the first lines of the horizontally aligned odd pixels, i.e. dots #1 and #2 of the pixel #1, those of the pixel #3, and so on. Then, the image signals representative of the dots in the first lines of the horizontally aligned even pixels, i.e. dots #1 and #2 of the pixel #2, those of the pixel #4, and so on, are sequentially printed out. Thereupon, one line of image signals are fed to start on the printout of the next one line of image signals in the same sequence, that is, the image signals representative of the dots #3 and #4 of the pixel #1 and those of the other odd pixels are printed out and, then, the image signals representative of the dots #3 and #4 of the pixel #2 and those of the other even pixels. Such is repeated to print out odd pixels and even pixels alternately.

In FIG. 3, the 2-bit, 4-gradation image signal coming in through the input terminal 10 is gated into the data convertion ROM 14 timed to the clock pulses which are output from the ½ divider 16. Among the outputs of the data conversion ROM 14, MSB of the image signal of the dot #1 in the first line of the pixel #1 shown in FIG. 5 is written into the RAM 18 as addressed by the RAM address control 22 and responsive to the first clock pulse of the synchronizing clock, then LSB of the image signal of the same dot is written into the RAM 20 responsive to the second clock pulse, then MSB of the video signal of the dot #2 in the first line of the pixel #1 is written into the RAM 18 responsive to the first clock pulse of the next synchronizing clock, then LSB of the same is written into the RAM 20 responsive to the second clock pulse, and so on. In this manner, MSBs of the image signals associated with the dots in the lines of the respective pixels are stored in the RAM 18, and LSBs in the RAM 20. After one line of image signals have been fully stored in the RAMs 18 and 20, the controller 24 applies a RAM read address start signal to the RAM address control 22 which then applies read addesses to the RAMs 18 and 20 and, at the same time, a data write sync signal $S_1$ to the resistance element driving circuit B. The image signals stored in the RAMs 18 and 20 are sequentially read out as addressed by the read address and, then, delivered to the AND gates 26 and 28, respectively.

As previously mentioned, the MSB/LSB selection signal MLS from the controller 24 is applied to the other input terminal of the AND gate 26 via the inverter 30, and directly to the other input terminal of the AND gate 28. Assume, for example, that when the selection signal MLS is a ZERO, MSB of an image signal is read out and, when it is a ONE, LSB of the same. Then, if the selection signal MLS is a ZERO and if the image signal thus read out of the RAM 18 is a ONE or a ZERO, the ONE or the ZERO signal from the RAM 18 is directly passed through the OR gate 32 to the AND gate 34 because the ZERO signal MLS coupled to the AND gate 26 has undergone inversion. In the meantime, the ZERO signal MLS is directly applied to the AND gate 28 so that even if a ONE or a ZERO read out of the RAM 20 is fed to the AND gate 28, the signal MLS remains to be a ZERO to prevent LSB of the image signal from being read out. When the signal MLS is a ONE, the opposite condition is set up wherein the image signal read out of the RAM 20 is produced as an output from the AND gate 28; LSB of the image signal being read out but not MSB.

Image signals associated with one line of pixels are read out as described above. Whether the pixel with which any of the image signals is associated is odd or even is decided as follows. First, the odd/even pixel selection counter 36 is initialize by a load signal WAD output from the controller 24 so as to set the upper bit, the lower bit being connected to ground to constantly remain to be "0". An arrangement may be made such that when the upper bit is "1", an odd pixel is selected and, when it is "0", an even pixel. After the initialization, the numerical value in the upper bit sequentially changes from "1" to "0" and from "0" to "1" responsive to the sync signals $S_1$.

The image signals output from the AND gate 34 are loaded in the shift register 38 timed to the sync signals $S_1$. One line of such image signals are loaded in the shift register 38 and latched in the latch 40. Each of the latched image signals is coupled to one input terminal of the associated AND gate 42a of the AND gate group 42. Then, a strobe $S_3$ from the controller 24 is applied to the input terminal of AND gate group 42. Since the outputs of the AND gates 42a of the group 42 respectively are coupled to their associated transistors 44a of the group 44 as previously stated, the strobe $S_3$ turns on selected ones of the transistors 44a to thereby apply current to those resistance elements 46a of the group 46 which are associated with the selected transistors 44a.

Figure 6:
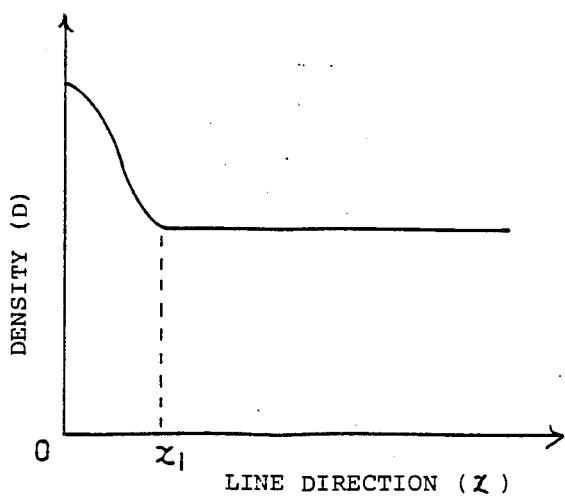
FIG. 6 shows a characteristic curve demonstrating the influence of heat generated by a resistance element which has been energized on a resistance element which is to be energized and attainable with the first embodiment.

As described above, in accordance with the first embodiment of the present invention, the heat-generating resistance elements of the thermal head are activated on an every second pixel basis so that any of the pixels which should be printed out is printed out upon the lapse of a predetermined period of time after the two pixels located at the right and left thereof have been printed out. As a result, as shown in FIG. 6, a particular resistance element which is associated with the pixel to be printed out is freed from thermal influence otherwise caused along the line by those elements which have generated heat. This, with a simple technique, allows images to be printed out without any irregular density distribution.

SECOND EMBODIMENT

In this particular embodiment, the strobe input of the first embodiment is so wired as to cause a thermal head to drive two dots at a time. The arrangement is such that resistance elements which are associated with odd pixels and those which are associated with even pixels are alternately energized and, at the same time, a plurality of odd resistance elements and a plurality of even resistance elements each are energized together.

Figure 7:
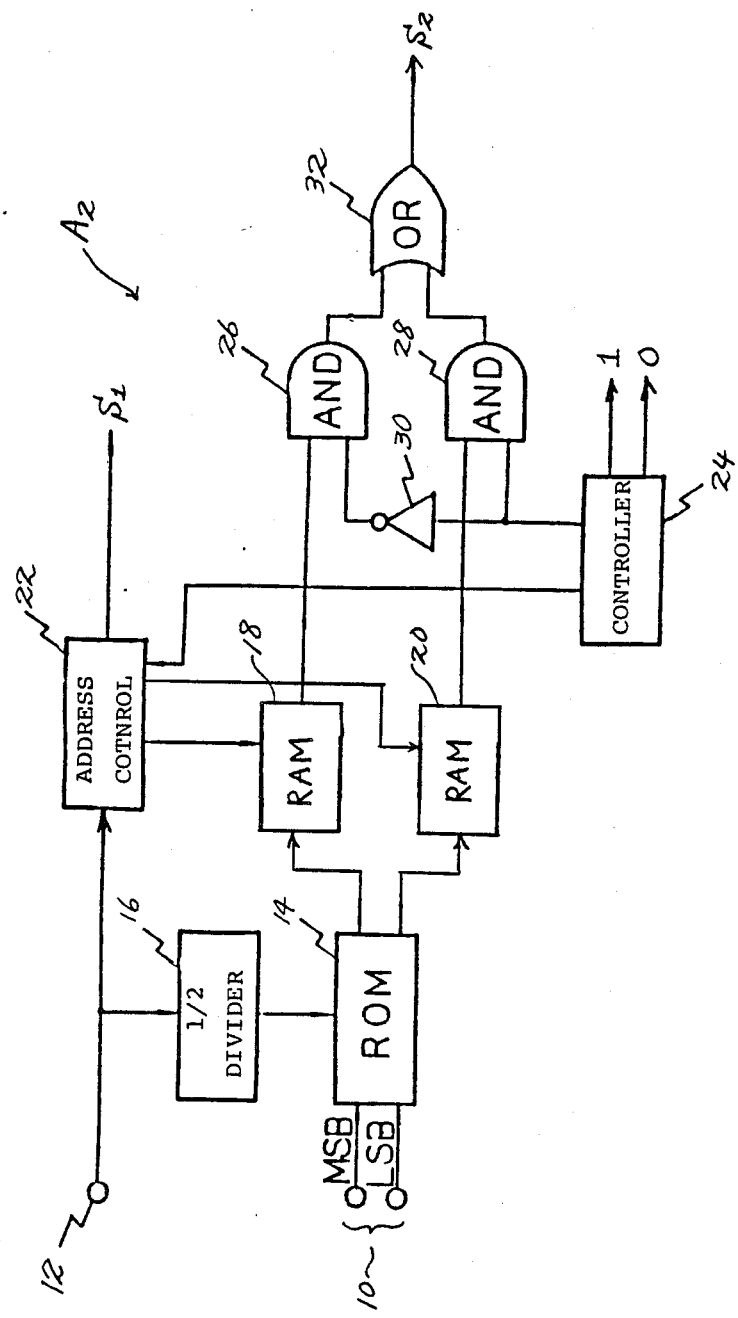
FIGS. 7 and 8 are diagrams showing a thermal head driving device in accordance a second embodiment of the present invention.
Figure 8:
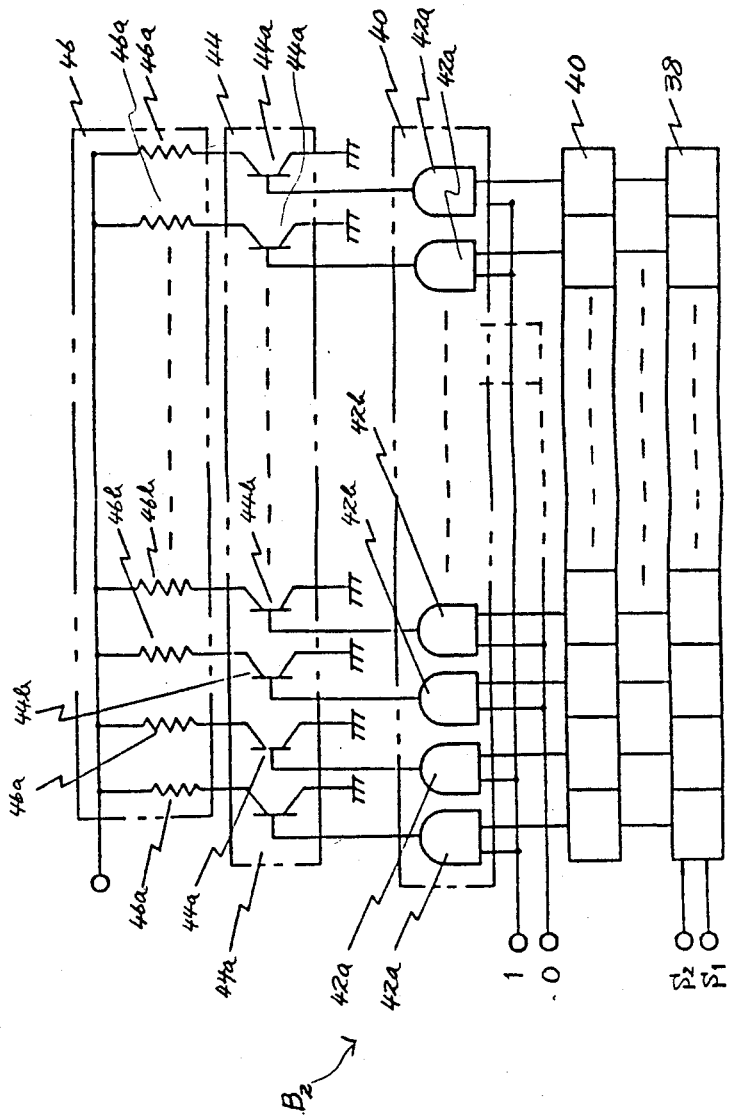

Specifically, as shown in FIGS. 7 and 8, the thermal head driver in accordance with the second embodiment generally comprises an image signal processing circuit $A_2$ (FIG. 7) and a resistance element driving circuit $B_2$ (FIG. 8). As shown in FIG. 8, the AND gate group 42 comprises AND gates 42a and 42b. Coupled to one input terminal of the respective AND gates 42a are the resistance element drive signals which are associated with the odd pixels of the latch 40, while coupled to one input terminal of the AND gates 42b are the resistance element drive signals which are associated with the even pixels of the latch 40. A first strobe, a ONE, is applied from the controller 24 to the other input terminal of the AND gates 42a so as to select image signals of the odd pixels. Likewise, a second strobe, a ZERO, is applied from the controller 24 to the other input terminal of the AND gates 42b to select image signals of the even pixels.

The second embodiment is the same as the first embodiment concerning how the image signals are read out of the RAMs 18 and 20. The image signals $S_2$ are latched in the latch 40. Each of the latched image signals is fed to one input terminal of its associated AND gate 42a or 42b of the group 42. Then, the first strobe, a ONE, is applied from the controller 24 to the input terminals of the respective AND gates 42a. Since the outputs of the AND gates 42a respectively are coupled to the bases of the transistors 42a associated therewith, the first strobe turns on particular ones of the transistors 44a to apply current to those resistance elements 46a which are associated with the odd pixels, thereby causing the elements 46a to generate heat. Meanwhile, since the outputs of the AND gates 42b are coupled to the bases of their associated transistors 44b, the second strobe, a ZERO, applied to the input terminals of the AND gates 42b turns on particular ones of the transistors 44b to apply current to those resistance elements 46b which are associated with the even pixels.

As discussed above, in accordance with the second embodiment, a thermal head so wired as to drive two dots at a time responsive to a particular strobe is used, while the resistance elements are driven such that those associated with odd pixels and those associated with even pixels are alternately energized and, in addition, a plurality of odd elements are energized at the same time and so are a plurality of even elements. The second embodiment, therefore, offers the same advantage as the first embodiment that any of the elements 46a which is associated with a pixel to be printed out generates heat only upon the lapse of a certain period of time after those elements 46b associated with the nearby pixels (in the line direction) have generated heat, receiving a minimum of influence of the heat generating elements which generated heat in the past.

While the second embodiment has been shown and described in relation to a pixel having 2×2 dots, it in principle is applicable to a pixel having n×n dots in which case a particular strobe will be applied to each n dots, where n is an integer greater than 2.

In summary, it will be seen that any of the embodiments of the present invention described above achieves various advantages as enumerated below.

(1) Heat-generating resistance elements of a thermal head are energized on an every second pixel basis so that a particular pixel to be printed out is prevented from being printed out until a predetermined period of time expires after two pixels which neighbor the particular pixel in a line direction have been printed out. This, with a relatively simple control circuit, reduces the influence of resistance elements which generated heat on a resistance element which is to generate heat.

(2) A thermal head in which strobes are wired such that each drives two dots at a time is used and heat-generating resistance elements are driven in a particular fashion, that is, resistances elements associated with odd pixels and those associated with even pixels are driven alternately with each other and, at the same time, a plurality of odd resistance elements and a plurality of even resistance elements each are driven together. The resulting advantage is the same as the advantage (1) stated above.

(3) With the advantage (1) or (2), the thermal head driver is capable of printing out images with an even density distribution despite the relatively simple technique.

Various modifications will become possible for those skilled in the art after receiving the teachings of the present disclosure without departing from the scope thereof.

What is claimed is:

1. A thermal head driving device for selectively causing a plurality of heat-generating resistance elements to generate heat for printing out images wherein said resistance elements are arranged in an array which constitutes a thermal head, said driving device comprising:
 means for generating a series of pixel images wherein each of said pixel images comprises an array of n×n dots with each of the said dots being represented by a particular image signal;
 a image signal processing circuit receiving said image signals wherein said image processing circuit includes a pixel separator means which separates the odd picture elements from the even picture elements and a resistance element driving circuit means;
 said image signal processing circuit including a means to store and read out at least one bit of each of said image signals, a selection means for producing a read out of said at least one bit in a predetermined sequence, and a controller means for controlling the feeding of selected ones of said read out bits to said resistance element driving circuit in such a manner that the resistance elements are driven on an every second pixel basis such that one pixel is printed out upon the laps of a predetermined period of time after two pixels which immediately neighbor said one pixel in a direction of a line being printed out.

2. The device according to claim 1 wherein said image signal is constituted by two bits with one of said bits being a most significant bit and the other of said bits being the least significant bit and herein said n×n array is a 2×2 array of dots for each pixel and wherein each of the horizontally aligned dots of the odd numbered pixel are sequentially printed out followed by the printing out sequentially of the horizontally aligned dots of the even numbered pixels.

3. A thermal head driving device for selectively causing a plurality of head-generating resistance elements to generate heat for printing out images wherein said heat-generating resistance elements are arranged in an array in order to form a thermal head, said driving device comprising:
 image signal processing circuit which receives an image signal comprising a plurality of bits;
 resistance element driving circuit responsive to the output of said image signal processing circuit wherein a first plurality of resistance elements is associated with odd pixels, with each of said odd pixels having a plurality of dots and wherein a second plurality of resistance elements is associated with even pixels each of which comprises a plurality of dots;
 said image signal processing circuit including a first control means for controlling the storing of each of said bits fed into said image processing circuit and a second controlling circuit for controlling the read out of said stored bits and for controlling the selection of odd and even pixels to be fed to said resistance element driving circuit wherein said second control means provides a printing signal to said resistance element driving circuit in order to simultaneously print each of said first plurality of resistance elements which are associated with odd pixels and subsequently to simultaneously print each of said second plurality of resistance elements associated with even pixels.

* * * * *